United States Patent
Bookbinder et al.

(10) Patent No.: US 10,322,963 B2
(45) Date of Patent: Jun. 18, 2019

(54) LOW ATTENUATION OPTICAL FIBER

(71) Applicant: Corning Incorporated, Corning, NY (US)

(72) Inventors: Dana Craig Bookbinder, Corning, NY (US); Ming-Jun Li, Horseheads, NY (US); Bruce Warren Reding, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 564 days.

(21) Appl. No.: 14/945,848

(22) Filed: Nov. 19, 2015

(65) Prior Publication Data

US 2016/0168008 A1 Jun. 16, 2016

Related U.S. Application Data

(60) Provisional application No. 62/086,281, filed on Dec. 2, 2014.

(51) Int. Cl.
*C03B 37/03* (2006.01)
*C03B 37/025* (2006.01)
(Continued)

(52) U.S. Cl.
CPC .......... *C03B 37/035* (2013.01); *C03B 37/025* (2013.01); *C03B 37/02727* (2013.01);
(Continued)

(58) Field of Classification Search
None
See application file for complete search history.

(56) References Cited

U.S. PATENT DOCUMENTS 3,761,234 A  9/1973 Siegmund
4,396,409 A  8/1983 Bailey et al.
(Continued)

FOREIGN PATENT DOCUMENTS

EP  0321182  6/1989
EP  1205449  5/2002
(Continued)

OTHER PUBLICATIONS

JPS623037A—JP62003037A EPO Machine Translation—Performed May 25, 2018. (Year: 2018).*
(Continued)

*Primary Examiner* — Lisa L Herring
(74) *Attorney, Agent, or Firm* — Kevin L. Bray

(57) ABSTRACT

An optical fiber with low attenuation is provided. The fiber is produced under conditions that reduce fictive temperature. Processing includes maintaining the fiber at temperatures at or near the glass transition temperature ($T_g$) for an extended period of time. For silica-based fibers, the preferred temperatures are temperatures between 1000° C. and 1700° C. The extended residence times are achieved in a continuous fiber manufacturing process by increasing the path length of the fiber through a processing region maintained at temperatures between 1000° C. and 1700° C. The increased path length is achieved by including one or more fluid bearing devices in the processing region. The extended residence time in the processing region allows the structure of the glass fiber to relax more completely and to more closely approach the equilibrium state. The more relaxed glass structure leads to a lower fictive temperature and provides fibers with lower attenuation.

18 Claims, 9 Drawing Sheets

(51) Int. Cl.
*C03B 37/035* (2006.01)
*C03B 37/027* (2006.01)

(52) U.S. Cl.
CPC ........ *C03B 37/032* (2013.01); *C03B 2205/42* (2013.01); *C03B 2205/56* (2013.01)

(56) References Cited

U.S. PATENT DOCUMENTS

| | | | |
|---|---|---|---|
| 5,236,032 | A | 8/1993 | Nukami et al. |
| 6,565,775 | B2 | 5/2003 | Dubois et al. |
| 6,576,164 | B2 | 6/2003 | Guenot et al. |
| 6,851,282 | B2 | 2/2005 | Nagayama et al. |
| 6,928,840 | B1 | 8/2005 | Nagayama et al. |
| 6,954,572 | B2 | 10/2005 | Moridaira et al. |
| 7,164,831 | B2 | 1/2007 | Kurusu et al. |
| 7,565,820 | B2 | 7/2009 | Foster et al. |
| 7,677,060 | B2 | 3/2010 | Oku et al. |
| 7,937,971 | B2 | 5/2011 | Costello, III et al. |
| 8,020,411 | B2 | 9/2011 | Moridaira et al. |
| 8,074,474 | B2 | 12/2011 | Filippov et al. |
| 8,973,408 | B2 | 3/2015 | Filippov et al. |
| 9,309,143 | B2 | 4/2016 | Dunwoody et al. |
| 2001/0006262 | A1 | 7/2001 | Dubois et al. |
| 2003/0086670 | A1 | 5/2003 | Moridaira et al. |
| 2005/0259932 | A1* | 11/2005 | Nagayama ........ C03B 37/02718 385/123 |
| 2005/0281521 | A1 | 12/2005 | Oku et al. |
| 2006/0204193 | A1 | 9/2006 | Okada et al. |
| 2007/0022786 | A1 | 2/2007 | Foster et al. |
| 2009/0139269 | A1* | 6/2009 | Filippov ........... C03B 37/02718 65/425 |
| 2009/0139270 | A1 | 6/2009 | Filippov et al. |
| 2011/0239709 | A1 | 10/2011 | Okada |
| 2011/0274404 | A1 | 11/2011 | Okada |
| 2011/0289980 | A1* | 12/2011 | Filippov ........... C03B 37/02718 65/435 |
| 2012/0014654 | A1 | 1/2012 | Haruna et al. |
| 2012/0053043 | A1 | 3/2012 | Haemmerle et al. |
| 2013/0182999 | A1 | 7/2013 | Jacobsen et al. |
| 2015/0040614 | A1 | 2/2015 | Dunwoody et al. |
| 2015/0251945 | A1 | 9/2015 | Nakanishi et al. |

FOREIGN PATENT DOCUMENTS

| | | |
|---|---|---|
| EP | 2535319 | 12/2012 |
| EP | 2933240 | 10/2015 |
| JP | 62003037 | 1/1987 |
| WO | 2014092110 | 6/2014 |

OTHER PUBLICATIONS

JP62003037A—English Translation Performed by McElroy Translation Company, Nov. 2010. (Year: 2010).*
International Search Report and Written Opinion PCT/US2015/062913 dated May 27, 2016.

* cited by examiner

US 10,322,963 B2

LOW ATTENUATION OPTICAL FIBER

This application claims the benefit of priority under 35 U.S.C. § 119 of U.S. Provisional Application Ser. No. 62/086,281 filed on Dec. 2, 2014 the content of which is relied upon and incorporated herein by reference in its entirety.

FIELD

This description pertains to optical fibers with low attenuation. This description also pertains to methods and systems for making optical fibers with low attenuation.

BACKGROUND

In the manufacturing of the optical fibers, the optical preforms are heated to temperatures much above the glass softening point and then drawn at large draw down ratios to form optical fibers 125 µm in diameter. Due to the high draw temperatures, large draw down ratios and fast draw speeds, the glass is far from the equilibrium state, resulting in fibers with high fictive temperature. High fictive temperature is undesirable for fibers used for transmission of optical signals because high fictive temperature is known to correlate with increased signal attenuation. To reduce signal attenuation in transmission fibers, it is desirable to modify fiber processing conditions to produce fibers with lower fictive temperature. Efforts to reduce fictive temperature have emphasized slow cooling of the fiber to stabilize the fiber in a state closer to the equilibrium state. Prolonged cooling the fiber in a critical temperature regime in the glass transition region of the fiber is one strategy for reducing fiber fictive temperature. The extent to which fiber fictive temperature can be reduced in existing fiber processing systems at the draw speeds used in optical fiber manufacturing, however, is limited because the residence time of the fiber at temperature within the critical regime are too short (<0.2 sec) to permit significant relaxation of the structure of the glass. Because of the short residence time, the structure glass remains far from the equilibrium state and only a modest decrease in fictive temperature is achieved. It would be desirable to develop methods of fiber processing that enable the production of fibers having low fictive temperature.

SUMMARY

The present description provides an optical fiber having low attenuation. The optical fiber is a glass fiber and is processed under conditions that promote more complete structural relaxation of the glass. The more complete structural relaxation leads to a lower fictive temperature for the fiber and reduces the attenuation of the fiber.

The present description extends to:
A method of processing an optical fiber comprising:
maintaining the temperature of an optical fiber between 1000° C. and 1700° C. for a time period of at least 0.5 sec at a draw speed greater than 30 msec.

The present description extends to:
An optical fiber comprising silica glass, said optical fiber having a fictive temperature less than 1450° C. and has an attenuation at 1550 nm of less than 0.18 dB/km.

The present description extends to:
An optical fiber comprising silica glass, said optical fiber having an attenuation less than 0.17 dB/km at 1550 nm.

The present description extends to:
An apparatus for processing an optical fiber comprising:
a processing region, said processing region configured to receive an optical fiber being conveyed in a first direction of conveyance, said processing region including a first zone configured to maintain said optical fiber at a first temperature between 1000° C. and 1700° C., said first zone including a first fluid bearing device, said first fluid bearing device configured to redirect said optical fiber from said first direction of conveyance to a second direction of conveyance, said first fluid bearing device effecting said redirection from said first direction of conveyance to said second direction of conveyance without directly contacting said optical fiber.

The present description extends to:
An apparatus for processing an optical fiber comprising:
a processing region, said processing region configured to receive an optical fiber being conveyed in a first direction of conveyance, said processing region including a first zone configured to maintain said optical fiber at a first temperature between 1000° C. and 1700° C., said first zone including a first fluid bearing device, said first fluid bearing device configured to redirect said optical fiber from said first direction of conveyance to a second direction of conveyance, said first fluid bearing device effecting said redirection from said first direction of conveyance to said second direction of conveyance without directly contacting said optical fiber, wherein said optical fiber is maintained at a second temperature between 1000° C. and 1700° C. along said second direction of conveyance, said second temperature differing from said first temperature.

The present description extends to:
An apparatus for processing an optical fiber comprising:
a processing region, said processing region configured to receive an optical fiber being conveyed in a first direction of conveyance, said processing region including a first zone configured to maintain said optical fiber at a first temperature between 1000° C. and 1700° C., said first zone including a first fluid bearing device, said first fluid bearing device configured to redirect said optical fiber from said first direction of conveyance to a second direction of conveyance, said first fluid bearing device effecting said redirection from said first direction of conveyance to said second direction of conveyance without directly contacting said optical fiber, wherein said optical fiber is maintained at a second temperature between 1000° C. and 1700° C. along said second direction of conveyance, said second temperature differing from said first temperature and wherein said optical fiber is maintained at said first temperature and said second temperature for a combined time greater than 0.5 sec.

The present description extends to:
An apparatus for processing an optical fiber comprising:
a processing region, said processing region configured to receive an optical fiber being conveyed in a first direction of conveyance, said processing region including a first zone configured to maintain said optical fiber at a first temperature between 1000° C. and 1700° C.; and
a heated fluid bearing device, said heated fluid bearing device configured to redirect said optical fiber from said first direction of conveyance to a second direction of conveyance without directly contacting said optical fiber, said heated fluid bearing device having a temperature between 500° C. and 1500° C.

The present description extends to:
An apparatus for processing an optical fiber comprising:
a processing region, said processing region configured to receive an optical fiber being conveyed in a first direction of conveyance, said processing region including a first zone configured to maintain said optical fiber at a first temperature between 1000° C. and 1700° C., said first zone including a first fluid bearing device, said first fluid bearing device configured to redirect said optical fiber from said first direction of conveyance to a second direction of conveyance, said first fluid bearing device effecting said redirection from said first direction of conveyance to said second direction of conveyance without directly contacting said optical fiber, the optical fiber maintained at a second temperature between 1000° C. and 1700° C. along the second direction of conveyance, wherein the total residence time of optical fiber maintained at first and second temperatures between 1000° C. and 1700° C. along first and second directions of conveyance is larger than 0.5 sec.

The present description extends to:

A method of processing an optical fiber comprising:

drawing an optical fiber;

delivering said optical fiber to a processing region, said processing region including one or more fluid bearing devices arranged in a first configuration, said one or more fluid bearing devices not engaging said optical fiber in said first configuration; said optical fiber passing through said processing region along a first pathway;

repositioning said one or more fluid bearing devices to a second configuration, said one or more fluid bearing devices engaging said optical fiber in said second configuration; said engaging effecting a redirection of said optical fiber from said first pathway to a second pathway.

The present description extends to:

A method of processing an optical fiber comprising:

drawing an optical fiber;

delivering said optical fiber to a processing region, said processing region including one or more fluid bearing devices arranged in a first configuration, said one or more fluid bearing devices not engaging said optical fiber in said first configuration; said optical fiber passing through said processing region along a first pathway;

repositioning said one or more fluid bearing devices to a second configuration, said one or more fluid bearing devices engaging said optical fiber in said second configuration; said engaging effecting a redirection of said optical fiber from said first pathway to a second pathway.

wherein the optical fiber has a residence time at temperatures between 1000° C. and 1700° C. of longer than 0.5 seconds along one of said first pathway, said second pathway, and a combination of said first pathway and said second pathway.

The present description extends to:

An apparatus for processing a fiber comprising:

a processing region maintained at a temperature between 1000° C. and 1700° C., said processing region including one or more fluid bearing devices, said one or more fluid bearing devices configured to receive and convey an optical fiber.

The present description extends to:

A method of processing an optical fiber comprising:

maintaining the temperature of an optical fiber between 1000° C. and 1500° C. for a time period of at least 0.5 sec at a draw speed greater than 30 m/s.

The present description extends to:

A method of processing an optical fiber comprising:

drawing an optical fiber from a preform at a draw speed greater than 30 m/s; and maintaining the temperature of the drawn optical fiber between 1000° C. and 1700° C. for a time period of at least 0.5 seconds.

The present description extends to:

A method of processing an optical fiber comprising:

drawing an optical fiber from a preform at a draw speed greater than 30 m/s; and maintaining the temperature of the drawn optical fiber between 1000° C. and 1500° C. for a time period of at least 0.5 seconds.

The present description extends to:

An optical fiber comprising silica glass, said optical fiber having an attenuation less than 0.18 dB/km at 1550 nm. In some embodiments, the optical fiber has an attenuation less than 0.17 dB/km at 1550 nm. In still other embodiments, the optical fiber has an attenuation less than 0.16 dB/km. In yet other embodiments, the optical fiber has an attenuation less than 0.15 dB/km. In yet other embodiments, the optical fiber has an attenuation less than 0.14 dB/km. In yet other embodiments, the optical fiber has an attenuation less than 0.12 dB/km.

The present description extends to:

An optical fiber comprising silica glass, said optical fiber having a fictive temperature less than 1450° C. In some embodiments, the optical fiber has a fictive temperature of less than 1400° C. and in some other embodiments the optical fiber has a fictive temperature of less than 1300° C.

The present description extends to:

An optical fiber comprising silica glass, said optical fiber having a fictive temperature less than 1450° C. and an attenuation at 1550 nm of less than 0.18 dB/km.

The present description extends to:

An apparatus for processing an optical fiber comprising:

a processing region, said processing region configured to receive an optical fiber being conveyed in a first direction of conveyance, said processing region including a first zone configured to maintain said optical fiber at a first temperature between 1000° C. and 1500° C., said first zone including a first fluid bearing device, said first fluid bearing device configured to redirect said optical fiber from said first direction of conveyance to a second direction of conveyance, said first fluid bearing device effecting said redirection from said first direction of conveyance to said second direction of conveyance without directly contacting said optical fiber.

The present description extends to:

An apparatus for processing a fiber comprising:

a processing region maintained at a temperature between 1000° C. and 1500° C., said processing region including one or more fluid bearing devices, said one or more fluid bearing devices configured to receive and convey an optical fiber.

The present description extends to:

A method of processing an optical fiber comprising:

drawing an optical fiber;

delivering said optical fiber to a processing region, said processing region including one or more fluid bearing devices arranged in a first configuration, said one or more fluid bearing devices not engaging said optical fiber in said first configuration; said optical fiber passing through said processing region along a first pathway;

repositioning said one or more fluid bearing devices to a second configuration, said one or more fluid bearing devices engaging said optical fiber in said second configuration; said engaging effecting a redirection of said optical fiber from said first pathway to a second pathway.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
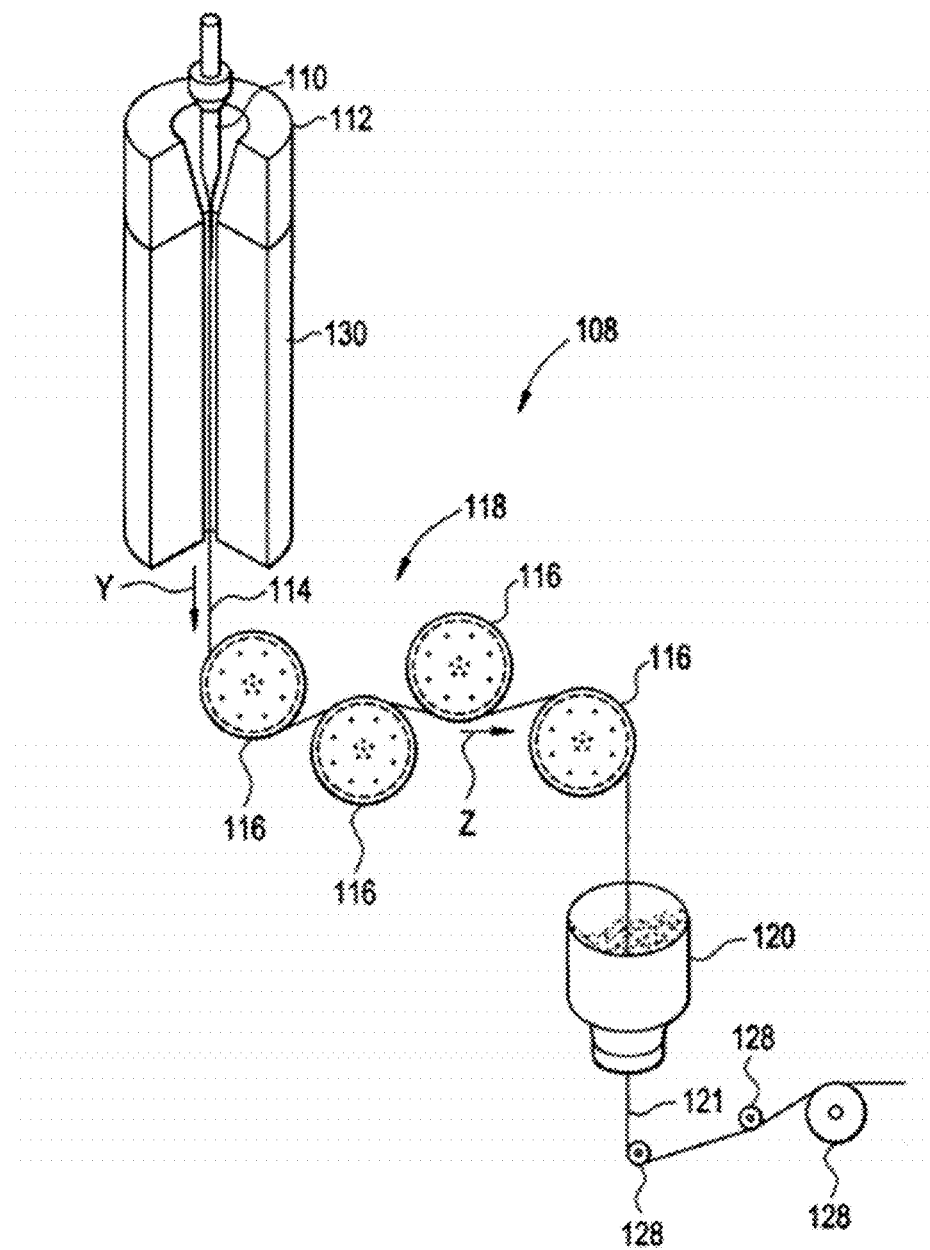
FIG. 1 depicts a system for manufacturing an optical fiber.

Reference will now be made in detail to illustrative embodiments of the present description.

The present description provides an optical fiber having low attenuation. The optical fiber is a glass fiber and is processed under conditions that promote more complete structural relaxation of the glass. The more complete structural relaxation leads to a lower fictive temperature for the fiber and reduces the attenuation of the fiber.

In conventional fiber processing, a fiber is formed by heating a glass preform above the softening point and drawing the fiber at large draw down ratios to form optical fibers with the desired diameter. For silica glass fibers, the preform diameter can be on the order of ~100-120 mm or larger and glass fibers drawn from the preform typically have a diameter of 125 μm. To manufacture silica glass fibers, the silica glass preform is heated to a temperature above 2000° C. and fiber is drawn at speeds of 10 m/s or higher. Due to the high draw temperatures, large draw down ratios and fast draw speeds, the glass structure of silica glass fibers is far from equilibrium. Without wishing to be bound by theory, it is believed that the non-equilibrium structure of silica glass fibers is a significant underlying cause of signal attenuation in silica glass fibers. It is accordingly believed that lower attenuation can be achieved in optical fibers by modifying processing conditions to stabilize glass structures that more closely approach the equilibrium structure.

For purposes of the present description, fictive temperature will be used as an indicator of glass structure. Glasses with high fictive temperature have structures that are further removed from equilibrium than glasses with low fictive temperature. Processing conditions that lower the fictive temperature of the glass produce optical fibers with structures that more closely approach equilibrium. Optical fibers with low fictive temperatures are expected to exhibit low attenuation.

The fictive temperature is the temperature at which the glass structure is at equilibrium. It can be measured via IR (infrared) beam measuring methods, using for example the method described in D. L. Kim and M. Tomozawa, "Fictive Temperature of Silica Glass Fiber,—Reexamination," Journal of Non-Crystalline Solids, 286, (2001) 132-138. As described herein, fictive temperature is the average radial fictive temperature of the optical fiber.

In accordance with the present description, processing conditions that extend the period of time in which the fiber is exposed to temperatures in the glass transition region during cooling are shown to facilitate relaxation of the structure of the fiber and to reduce the fictive temperature of the fiber. The glass transition region generally ranges between 1200° C. and 1700° C. for silica glass optical fibers. There may be additional relaxation of the glass below the glass transition region (sub-$T_g$ region), which corresponds to temperatures between 1000° C. and 1200° C. In one embodiment, the temperature window over which cooling facilitates relaxation of glass structure to provide an optical fiber with low fictive temperature ranges from 1000° C. to 1700° C. In another embodiment, the temperature window ranges from 1050° C. to 1600° C. In still another embodiment, the temperature window ranges from 1100° C. to 1500° C.

Optical fibers are generally drawn in air. Cooling rates in air generally exceed 12000° C./sec during the draw process when the fiber is at a temperature above 1000° C., and result in glass fictive temperature of higher than 1550° C. and higher optical fiber attenuation. Some prior art has been reported that discloses drawing of optical fiber in which the optical fiber is exposed to a heated furnace at the draw such that the optical fiber experiences temperatures between 1200° C. and 1700° C. for less than 0.1 sec and in some cases less than 0.2 sec. The present description discloses methods of drawing optical fiber in which the optical fibers are maintained at temperatures between 1000° C. and 1700° C. for longer than 0.5 sec in some embodiments, for longer than 1 sec in some other embodiments, and for longer than 2 sec in still other embodiments. The present methods permit maintaining the fiber at temperatures between 1000° C. and 1700° C. for longer than 0.5 sec, or longer than 1 sec, or longer than 2 sec for draw speeds greater than 10 m/s, or greater than 20 m/s, or greater than 30 m/s, or greater than 40 m/s, or greater than 50 m/s, or greater than 60 m/s.

FIG. 1 depicts a typical system for producing optical fibers from the prior art. System 108 includes fiber preform 110 situated in furnace 112. Fiber preform 110 is constructed of a glass, such as silica glass, and may include regions of different composition. Preform 110, for example, may include regions of modified and unmodified silica glass with compositions corresponding to the core and cladding compositions desired for fibers drawn from the preform. Fiber preform 110 is heated in furnace 112 and a fiber 114 is drawn therefrom. Fiber 114 enters treatment zone 130 and begins to cool. Fiber 114 exits treatment zone 130 and is directed through a cooling region 118 that includes a series of fluid bearing devices 116. Fluid bearing devices 116 further cool the fiber and direct the fiber to coating unit 120, at which a coating is applied to provide coated fiber 121. After exiting coating unit 120, coated optical fiber 121 may go through a variety of other processing stages within the system that are known in the art (not shown). Drawing mechanisms 128 are used to provide tension on the optical fiber as it is drawn through system 108.

Fluid bearing devices are described in U.S. Pat. No. 7,937,971, the disclosure of which is incorporated by reference herein. A general description of the construction and operation of an illustrative fluid bearing device follows. It should be understood, however, that other designs are possible for the fluid bearing devices and that the benefits achievable by the methods and apparatus disclosed herein are not limited to a particular design for fluid bearing devices.

Figure 2:
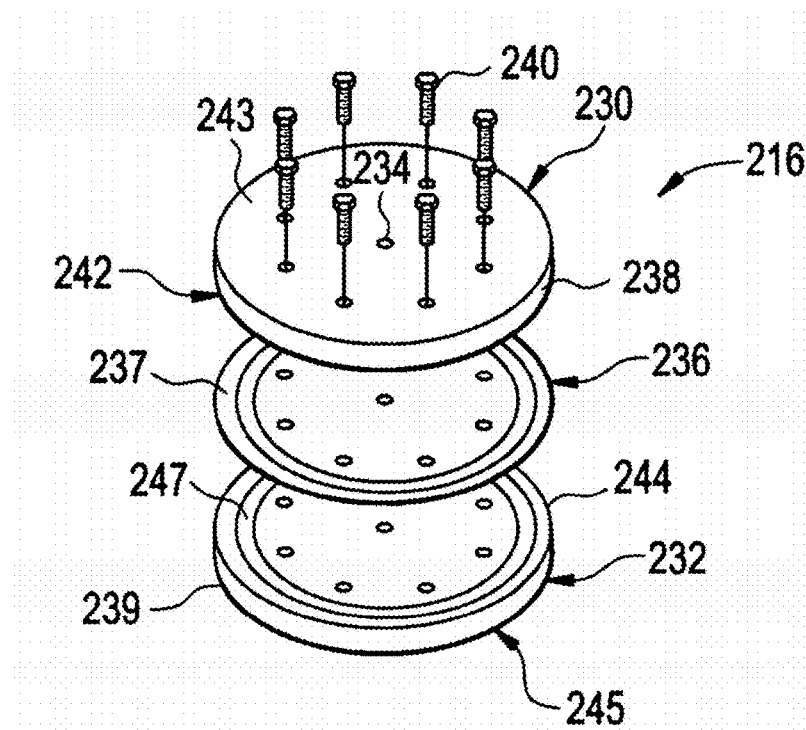
FIG. 2 depicts a fluid bearing device for use in an optical fiber production system.
Figure 3:
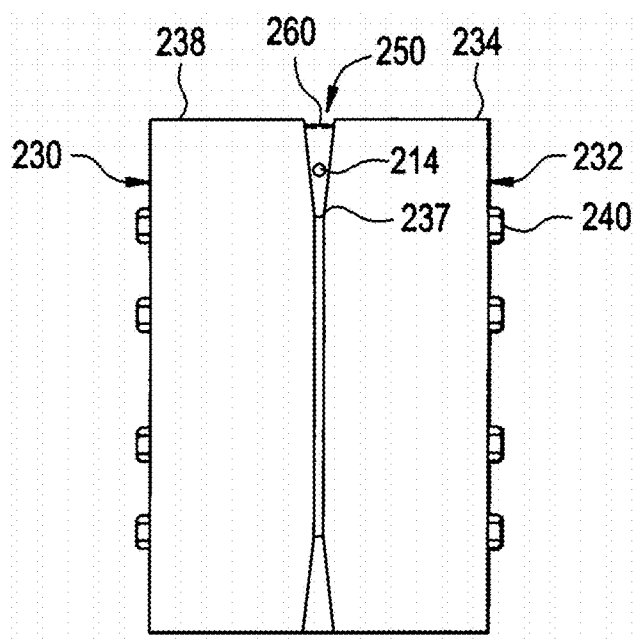
FIG. 3 depicts a fluid bearing device in side view.

A typical design for a fluid bearing device is shown in FIGS. 2 and 3. Fluid bearing device 216 in FIG. 2 includes a first plate 230, a second plate 232, an inner member 236 and at least one opening 234 in at least one of the first and second plates. The first plate 230 and the second plate 232 can be made of metal and include arcuate outer surfaces 238 and 239, respectively. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated in FIG. 2, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 3 (discussed later herein). At least one opening 234 passes through at least one of the first plate 230 and the second plate 232. As shown in FIG. 2, the opening 234 of the first plate 230 and the second plate 232 allow for a fluid (e.g., air, helium or other desired gas or liquid) to be fed through the fluid bearing device 216 from opening 234 to the fiber support channel 250 that is formed between the first plate 230 and the second plate 232. As described more fully hereinbelow, the fluid supplied to channel 250 creates a high pressure region between the fiber and the surface of channel 250. The fluid, in combination with the tension driving the draw, acts to stabilize the fiber in channel 250 and to position the fiber above the surface of channel 250 to prevent mechanical contact of the fiber with the fluid bearing device. The fluid passed through the fluid bearing device may be referred to herein as a levitating fluid. The levitating fluid may be a gas or liquid. Representative levitating fluids include air, $N_2$, and inert gases.

In addition, the fluid bearing device 216 may include an inner member 236 positioned between the first plate 230 and the second plate 232. The inner member 236 (e.g., a shim 237) is configured to aid in directing the levitating fluid to the region between the outer surfaces 238, 239 of the first plate 230 and the second plate 232 such that the levitating fluid exits the fiber support channel 250 having a predetermined flow direction. The inner member 236 rests between the first plate 230 and second plate 232 to provide a gap therebetween. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber.

As shown in FIG. 3, the fiber support channel 250 formed between the outer surfaces 238, 239 of the first plate 230 and the second plate 232 can be tapered where the levitating fluid exits between the first plate 230 and the second plate 232. In another embodiment however, fiber support channel 250 may include a parallel or reverse tapered shape, for example. In addition, the opening 260 within the tapered fiber support channel 250 is variable depending on where the optical fiber 214 is positioned. Preferably, the opening 260 and the fiber support channel 250 are configured so that, for the particular draw tensions and draw speeds employed and flow rates of the levitating fluid through the opening 260, the optical fiber is maintained in a section of fiber support channel 250 which is less than 500 μm, more preferably less than 400 μm, even more preferably 300 μm, and most preferably less than 200 μm wide, for a fiber having a typical outer diameter of 125 μm. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

In the embodiment illustrated in FIG. 3, for ease of viewing, the tapered angle has been exaggerated in the illustration from what is a preferred angle of taper opening to fiber support channel 250. In reality, at least one of and preferably both of the opposing surfaces of support channel 250 are each inclined, preferably at an angle greater than 0° and less than 10°, more preferably between 0.3° and 7°, and most preferably between 0.4° and 3°, so that the width 260 of the top or outer portion of fiber support channel 250 is wider than the width 260 of the bottom or inner portion 237 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 and injecting the fluid into the slot formed by fiber support channel 250 so that the fluid enters the narrower inner portion of fiber support channel 250 and exits the wider outer region of fiber support channel 250, the cushion of levitating fluid emitted through channel 250 will cause the fiber to be self-locating within the depth of the channel 250. For example, for a given rate of flow of the levitating fluid, if the fiber draw tension is increased, the fiber will move downward in the channel 250 until the gaps between the fiber 214 and channel walls are small enough that the pressure in region 237 is high enough to correctly counteract the new higher tension. If the fiber draw tension is decreased, the fiber will move upwardly within the channel 250 until the gaps between fiber 214 and channel walls are large enough that the pressure in region 237 is small enough to counteract the new, lower tension. Tapering the channel 250 thus enables the channel 250 to work with a wider range of draw tensions. Otherwise, if channel 250 as shown was not tapered and the draw tension was decreased, the fiber may travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example, as the fiber gets closer to either opposing surface of channel 250, the velocity of the levitating fluid will increase nearest one surface and decrease nearest the other. According to the Bernoulli effect, an increase in levitating fluid velocity occurs simultaneously with a decrease in pressure. As a result, the greater pressure caused by the decreased levitating fluid flow near one surface will force the fiber back into the center of channel 250. Thus, in the preferred embodiments, the fiber is centered within the fiber support channel 250 at least substantially via the Bernoulli effect due to a stream of levitating fluid that is passing around the fiber and out of the fiber support channel 250 while the fiber is being drawn. Notably, such centering occurs without having to utilize any flow of levitating fluid that would impinge upon the fiber from the side thereof, e.g., there are no jets of levitating fluid emanating from sidewalls of channel 250. The velocity of the stream of levitating fluid traveling through the slot is preferably adjusted to maintain the fiber so that the fiber is located entirely within a tapered region of the slot 250. In the embodiment of FIG. 3, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated in FIG. 3, the fluid stream is preferably provided by a single levitating fluid stream that enters fiber support channel 250 via the narrower inner portion of fiber support channel 250 and exits via the wider outer region 260 of fiber support channel 250. In this way, the fiber can be positioned entirely within the slot formed by fiber support channel 250 such that the fiber floats between the narrowest and widest portion of the slot. By employing a tapered fiber support channel 250 and injecting the levitating fluid through the region 250 in this manner, it is possible to retain a fiber in a region of said slot formed by fiber support channel 250 wherein the slot has a width that is between 10 µm to 150 µm, more preferably between 15 µm and 100 µm, and most preferably between about 24 µm 70 µm greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the levitating fluid flow. Such a means for releasing pressure can be achieved in the form of a tapered channel design, as described above.

The fluid bearing devices enable the optical fiber to travel along the region of levitating fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing device is capable of maintaining the fiber within the region without mechanical contact through a range of draw tensions without active control of the levitating fluid flow.

The levitating fluid flow can be important to prevent the optical fiber 214 from moving towards the bottom of the fiber support channel 250 and coming in contact with the shim 237 or the sides of the fiber support channel 250. This is particularly important when the optical fiber is still uncoated so that the fiber quality is not compromised by the mechanical contact with the fluid bearing device or channel 250. Moreover, it is believed the closer the optical fiber 214 is positioned relative to the bottom of the fiber support channel 250, the higher the pressure needs to be within the fiber support channel 250 to maintain the optical fiber 214 at the desired location. As is evident, the taper in channel sides will cause the gaps between the channel sides and the fiber to be smaller, causing this necessary higher pressure.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the flow of levitating fluid exiting the region of the fluid bearing be sufficient to maintain the optical fiber at the desired location for the particular fiber draw speed and draw tension employed.

For example, in an embodiment that utilizes a fiber support channel 250 having a width of about 127 µm at the innermost section between plates 230 and 232 and approximately 380 µm at the outermost section, the levitating fluid flow rate can be from about 0.5 L/sec to more than 5 L/sec. Such a configuration and flow of levitating fluid can result in local fluid velocities around the optical fiber of up to 800 km/hour or higher. Thus, in some embodiments the maximum levitating fluid velocities around the fiber employed in the fiber support channel 250 are higher than 100 km/hr, higher than 200 km/hr, higher than 400 km/hr, and possibly even higher than 600 km/hr. In some embodiments, maximum levitating fluid velocities around the fiber employed in the fiber support channel 250 may be higher than 900 km/hr. However, the methods disclosed herein are certainly not limited to these velocities, and in fact the velocity preferably can be chosen to result in the fiber being located at a desired location within fiber support channel 250, depending on draw conditions (e.g. draw speed, draw tension, etc.) and fluid bearing design. In another embodiment, the flow rate of levitating fluid can be from about 3 L/sec to about 4 L/sec.

Of course, any rate of flow of levitating fluid sufficient to maintain the optical fiber at the desired location at a given draw tension can be utilized.

In some embodiments, the speed that the optical fiber is drawn at is greater than 10 m/s, in other embodiments, the speed is greater than 20 m/s, in other embodiments, the speed is greater than 30 m/s, in other embodiments, the speed is greater than 40 m/s, in other embodiments, the speed is greater than 50 m/s, and still in other embodiments, the speed is greater than 60 m/s, One of the drawbacks of system 108 shown in FIG. 1 is that the rate of cooling of the fiber is high when using the high draw speeds desired for manufacturing. Cooling rates of 12,000° C./sec or higher are encountered under conditions typically used to manufacture optical fibers, that is, during the draw process when the fiber is at a temperature above 1000° C. The high cooling rates lead to fibers having high fictive temperatures (~1500° C.) and high attenuation.

A possible strategy for decreasing the cooling rate include increasing the temperature of treatment zone 130 to more closely match the temperature of the fiber as it enters treatment zone 130. A lower temperature difference between treatment zone 130 and furnace 112 would lower the cooling rate of the fiber. In principle, treatment zone 130 could include a temperature gradient that permits gradual cooling of the fiber from its entrance temperature (1500° C. or above) to lower temperatures in such a way that the residence time of the fiber in the 1000° C.-1700° C. range is sufficiently long to achieve the structural relaxation needed to lower fictive temperature as described herein. Alternatively, the fiber processing system might include multiple treatment zones operated at progressively decreasing temperatures to cool the fiber while prolonging the residence time of the fiber in the preferred 1000° C.-1700° C. temperature window.

Although conceptually viable, strategies for controlled cooling of the fiber that involve adjustments of the conditions of treatment zone 130 are difficult to implement in practice. In order to control cooling of the fiber to best facilitate the structural relaxation needed to achieve low fictive temperature, it is necessary to maximize the time at which the temperature of the fiber is in the preferred 1000° C.-1700° C. temperature window identified herein. When the prior art fiber processing system shown in FIG. 1 is operated at commercial draw speeds, the time at which the fiber temperature is in the 1200° C.-1700° C. temperature window is limited to ~0.2 sec. This time is too short to permit significant structural relaxation of the glass and the fictive temperature of fiber produced from the system is accordingly high (~1500° C.). In order to increase the residence time between 1000° C. and 1700° C., it is necessary to control the temperature of treatment zone 130 to reduce the rate of cooling. As noted hereinabove, proper control of the temperature requires a more gradual reduction in the temperature of the fiber to ensure an adequate residence time of the fiber in the 1000° C.-1700° C. temperature window. As the reduction in temperature becomes more gradual, however, the length of treatment zone 130 increases. To establish the gradual controlled cooling necessary to reduce the fictive temperature of the fiber meaningfully below 1500° C. at commercial draw speeds, the required length of treatment zone 130 would exceed the vertical headspace (floor-to-ceiling) available in most production facilities. Modification of existing facilities to accommodate greater vertical headspace would increase the cost of production to an unreasonable degree. An alternative approach of reducing draw speed within existing limits of vertical headspace is also undesirable because it leads to higher costs through lower manufacturing throughput.

Incorporation of fluid bearing devices into the fiber processing system is advantageous because they enable redirection of the fiber during processing in a horizontal or other non-vertical direction. By incorporating fluid bearing devices into the system, the path length available for fiber processing can be increased without a need to increase vertical space in the facility. In system 108 shown in FIG. 1, fluid bearing devices 116 redirect uncoated fiber 114 from a vertical direction to a more nearly horizontal direction as uncoated fiber 114 exits treatment zone 130. In the configuration shown in FIG. 1, fluid bearing devices 116 deliver uncoated fiber 114 to coating unit 120. In an alternative configuration, the fiber processing system could be modified to include a second treatment zone parallel to the treatment zone 130 and the fiber bearing devices could redirect the fiber in a vertically upward direction to deliver the fiber to the second treatment zone to further extend the path of cooling in an attempt to slow the cooling rate to a degree sufficient to produce fibers with lower fictive temperature.

In the system configuration of FIG. 1, however, fluid bearing devices 116 are counterproductive to the objective of achieving fibers with low fictive temperature. Instead of enabling controlled cooling at slow rates, fluid bearing devices 116 as deployed in FIG. 1 facilitate rapid cooling of the fiber. As the optical fiber 114 is transported over the fluid bearing devices 116, the region of levitating fluid cushion on each fluid bearing 116 acts to cool the optical fiber 114. Because the levitating fluid stream employed by the fluid bearing device to support and seat the fiber is in motion, the optical fiber is cooled at a rate that is faster than the fiber would cool in quiescent air at room temperature. The greater the temperature differential between the optical fiber and the levitating fluid in the fluid bearing, the greater the ability of the levitating fluid bearing to cool the optical fiber 114. In the deployment of FIG. 1, the levitating fluid supplied to fluid bearings 116 is air or an inert gas at room temperature. As described hereinabove, in order to support and levitate the fiber to prevent mechanical contact of the fiber with the fluid bearing device, the velocity of the levitating fluid supplied to channel 250 is high. The use of such high levitating fluid flow velocities greatly increases the rate of cooling of the fiber through convective processes. The larger the difference between the temperature of the fiber and the temperature of the levitating fluid being supplied by the fluid bearing device, and the higher the levitating fluid flow velocity, the faster the rate of cooling of the fiber.

In the fiber processing systems of the prior art, the levitating fluid supplied by fluid bearing devices is at room temperature and the fiber exiting the treatment zone and entering the assembly of fluid bearing devices is typically at a temperature of 500° C. or higher, and more typically at a temperature of 1000° C. or higher. At typical fiber draw speeds and typical levitating fluid velocities through the fluid bearing device, the temperature of the fiber can be reduced by several hundred to over 1000° C. over a length of 1-2 m as the fiber passes over a fluid bearing device. The fast fiber cooling rates provided by the fluid bearing devices as deployed in the prior art have been viewed as beneficial because they may simplify fiber processing systems by obviating the need for helium cooling devices.

While the prior art has recognized rapid cooling of the fiber with fluid bearing devices as advantageous, the present description recognizes that the timescale over which fiber cooling occurs is far shorter than the times needed to facilitate the structural relaxation necessary to achieve low fiber fictive temperature and produce fibers with low attenuation. The present description provides a new processing system designed to provide fibers with low fictive temperatures. The system includes fluid bearing devices for altering the path of the fiber through the processing system and is designed to prolong the residence time of the fiber at temperatures in the range from 1000° C. to 1700° C. to larger than 0.5 sec in some embodiments, to larger than 1 sec in some other embodiments, to larger than 2 sec in still other embodiments and larger than 5 sec in yet other embodiment, and larger than 10 sec in further embodiments. The prolonged residence times may be achieved at process draw speeds of greater than 10 m/s, or greater than 20 m/s, or greater than 30 m/s, or greater than 40 m/s, or greater than 50 m/s, or greater than 60 m/s.

The present system overcomes two aspects of the prior art system shown in FIG. 1 that are detrimental to the objective of achieving fibers with low fictive temperature. First, the temperature of the levitating fluid supplied to the fluid bearing devices is far below the temperature of the fiber when it engages the fluid bearing device. Second, the fluid bearing devices are positioned in the room temperature environment outside of the heat treatment zone. Both factors lead to rapid cooling of the fiber because of the large difference in temperature between the fluid bearing device and the fiber.

In one embodiment of the present system, the levitating fluid supplied to the fluid bearing devices is heated to reduce the difference in temperature between the levitating fluid and the fiber. In another embodiment, the fluid bearing devices are placed in a furnace or other heated processing region to maintain them at high temperature. The two embodiments may also be combined. The objective in all embodiments is to manage the cooling rate of the fiber to ensure adequate residence time of the fiber in the glass transition region of the fiber. In the case of silica-based fibers, the preferred temperature window is in the range from 1000° C. to 1700° C., or in the range from 1050° C. to 1600° C., or in the range from 1100° C. to 1500° C., or in the range from 1100° C. to 1400° C. By configuring the processing system to provide adequate time of exposure of the fiber to temperatures in the preferred window, the rate of cooling can be controlled to facilitate more complete relaxation of the structure of the fiber. The structure of the fiber more closely approaches the equilibrium structure and the fictive temperature of the fiber is reduced.

Figure 4:
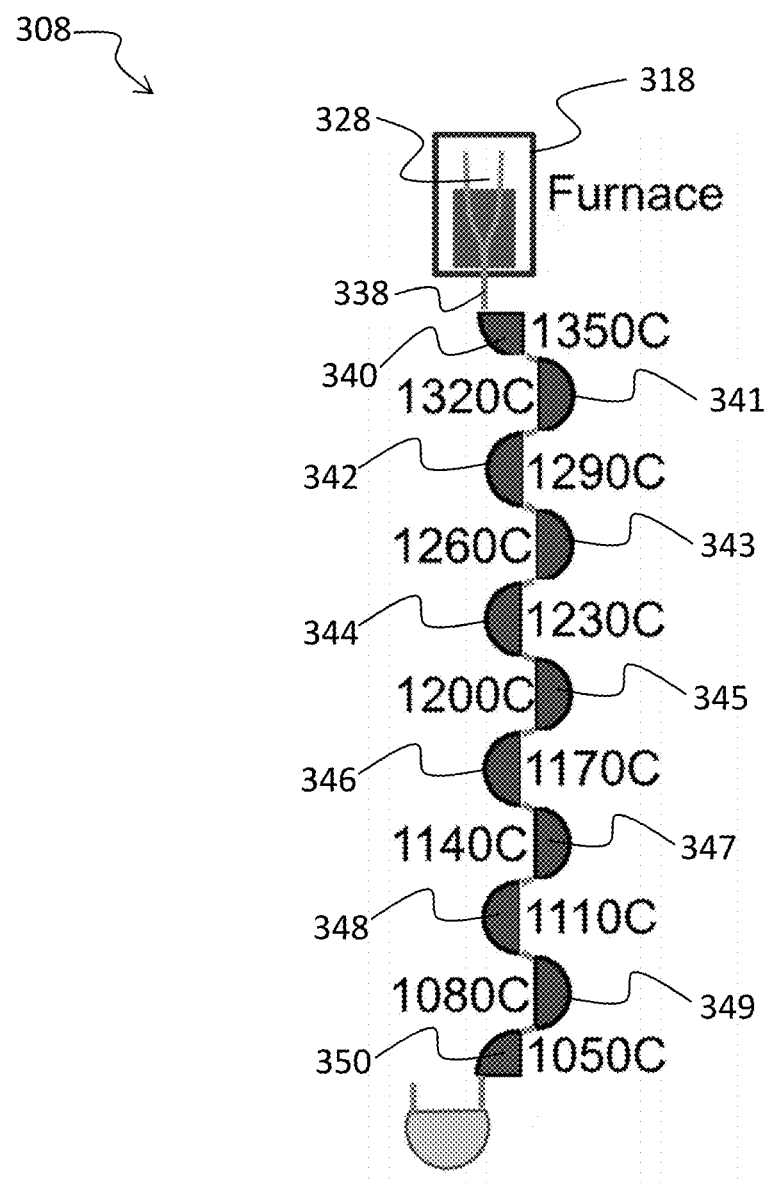
FIG. 4 depicts an embodiment of a fiber processing system having fluid bearing devices that manage the cooling rate of the fiber.

FIG. 4 shows a section of a fiber processing system that includes a plurality of fluid bearing devices operatively connected to a draw furnace. System 308 includes draw furnace 318 with fiber preform 328. Fiber 338 is drawn from preform 328 and is conveyed through a series of fluid bearing devices 340-350. Conveyance is driven by tension provided by a drawing mechanism (not shown). The direction of motion of the fiber during conveyance may be referred to herein as the direction of conveyance of the fiber. The direction of conveyance of the fiber may vary along the pathway of the fiber through the processing system. Fluid bearing devices may redirect the fiber from one direction of conveyance to another direction of conveyance.

The fluid bearing devices may have the design shown in FIGS. 2 and 3 and are supplied with a levitating fluid that has been heated. Heating of the levitating fluid reduces the temperature difference between the fiber and the fluid bearing device. As seen in FIG. 4, the series of fluid bearing devices 340-350 includes fluid bearing devices supplied with levitating fluids at different temperatures. The temperatures listed in FIG. 4 next to each fluid bearing device corresponds to the approximate temperature of the fiber as it passes through the fluid bearing device. The temperature of the levitating fluid may differ from the temperature of the fiber and is adjusted to provide a desired fiber temperature at a particular position within the processing system. The fiber temperature at the different fluid bearing devices is designed to control the rate of cooling of the fiber to facilitate structural relaxation and to obtain fibers with low fictive temperature.

The temperatures shown in FIG. 4 are illustrative and show a stepwise decrease in fiber temperature in which the temperature differential between adjacent fluid bearing devices is 30° C. Fiber 338 may exit draw furnace 318 at a temperature above 1650° C. and is directed to a fluid bearing device 340 that is configured to cool the fiber to 1350° C. Fluid bearing device 340 directs fiber 338 to fluid bearing device 341, which further cools the fiber to 1320° C. The process continues and the fiber is controllably cooled in gradual increments to a temperature of 1050° C. at fluid bearing device 350. After exiting fluid bearing device 350, the fiber may be directed to additional fluid bearing devices for further controlled cooling or to other process units (e.g. coating units, testing units, or spooling units).

The description is not limited to a particular temperature differential between adjacent fluid bearing devices and extends generally to any temperature variation across a series of fluid bearing devices. In one embodiment, the temperature variation across a series of fluid bearing devices is descending in the direction of fiber draw. The temperature differential between adjacent fluid bearing devices may be constant or variable. The variable or constant temperature differential between adjacent fluid bearing devices may be in the range from 5° C. to 100° C., or in the range from 10° C. to 80° C., or in the range from 15° C. to 60° C., or in the range from 20° C. to 40° C.

The number of fluid bearing devices in the fiber processing system that supply a heated levitating fluid may be two or more, or four or more, or six or more, or eight or more, or ten or more.

The number, position and levitating fluid temperatures of the fluid bearing devices may be controlled to control the time period during fiber draw over which the fiber temperature is in the temperature window from 1000° C. to 1700° C. for a given draw speed in a continuous manufacturing process. In one embodiment, the time period over which the fiber temperature is in the range from 1000° C. to 1700° C. is at least 0.5 sec for draw speeds of greater than 10 m/s, or greater than 20 m/s, or greater than 30 m/s, or greater than 40 m/s, or greater than 50 m/s, or greater than 60 m/s. In another embodiment, the time period over which the fiber temperature is in the range from 1000° C. to 1700° C. is at least 1.0 sec for draw speeds of greater than 10 m/s, or greater than 20 m/s, or greater than 30 m/s, or greater than 40 m/s, or greater than 50 m/s, or greater than 60 m/s. In still another embodiment, the time period over which the fiber temperature is in the range from 1000° C. to 1700° C. is at least 2.0 sec for draw speeds of greater than 10 m/s, or greater than 20 m/s, or greater than 30 m/s, or greater than 40 m/s, or greater than 50 m/s, or greater than 60 m/s. In yet another embodiment, the time period over which the fiber temperature is in the range from 1000° C. to 1700° C. is at least 5.0 sec for draw speeds of greater than 10 m/s, or greater than 20 m/s, or greater than 30 m/s, or greater than 40 m/s, or greater than 50 m/s, or greater than 60 m/s. In a further embodiment, the time period over which the fiber temperature is in the range from 1000° C. to 1700° C. is at least 10.0 sec for draw speeds of greater than 10 m/s, or greater than 20 m/s, or greater than 30 m/s, or greater than 40 m/s, or greater than 50 m/s, or greater than 60 m/s.

The number, position and levitating fluid temperatures of the fluid bearing devices may be controlled to control the time period during fiber draw over which the fiber temperature is in the temperature window from 1100° C. to 1700° C. for a given draw speed in a continuous manufacturing process. In one embodiment, the time period over which the fiber temperature is in the range from 1100° C. to 1700° C. is at least 0.5 sec for draw speeds of greater than 10 m/s, or greater than 20 m/s, or greater than 30 m/s, or greater than 40 m/s, or greater than 50 m/s, or greater than 60 m/s. In another embodiment, the time period over which the fiber temperature is in the range from 1100° C. to 1700° C. is at least 1.0 sec for draw speeds of greater than 10 m/s, or greater than 20 m/s, or greater than 30 m/s, or greater than 40 m/s, or greater than 50 m/s, or greater than 60 m/s. In still another embodiment, the time period over which the fiber temperature is in the range from 1100° C. to 1700° C. is at least 2.0 sec for draw speeds of greater than 10 m/s, or greater than 20 m/s, or greater than 30 m/s, or greater than 40 m/s, or greater than 50 m/s, or greater than 60 m/s. In yet another embodiment, the time period over which the fiber temperature is in the range from 1100° C. to 1700° C. is at least 5.0 sec for draw speeds of greater than 10 m/s, or greater than 20 m/s, or greater than 30 m/s, or greater than 40 m/s, or greater than 50 m/s, or greater than 60 m/s. In a further embodiment, the time period over which the fiber temperature is in the range from 1100° C. to 1700° C. is at least 10.0 sec for draw speeds of greater than 10 m/s, or greater than 20 m/s, or greater than 30 m/s, or greater than 40 m/s, or greater than 50 m/s, or greater than 60 m/s.

The number, position and levitating fluid temperatures of the fluid bearing devices may be controlled to control the time period during fiber draw over which the fiber temperature is in the temperature window from 1200° C. to 1700° C. for a given draw speed in a continuous manufacturing process. In one embodiment, the time period over which the fiber temperature is in the range from 1200° C. to 1700° C. is at least 0.5 sec for draw speeds of greater than 10 m/s, or greater than 20 m/s, or greater than 30 m/s, or greater than 40 m/s, or greater than 50 m/s, or greater than 60 m/s. In another embodiment, the time period over which the fiber temperature is in the range from 1200° C. to 1700° C. is at least 1.0 sec for draw speeds of greater than 10 m/s, or greater than 20 m/s, or greater than 30 m/s, or greater than 40 m/s, or greater than 50 m/s, or greater than 60 m/s. In still another embodiment, the time period over which the fiber temperature is in the range from 1200° C. to 1700° C. is at least 2.0 sec for draw speeds of greater than 10 m/s, or greater than 20 m/s, or greater than 30 m/s, or greater than 40 m/s, or greater than 50 m/s, or greater than 60 m/s. In yet another embodiment, the time period over which the fiber temperature is in the range from 1200° C. to 1700° C. is at least 5.0 sec for draw speeds of greater than 10 m/s, or greater than 20 m/s, or greater than 30 m/s, or greater than 40 m/s, or greater than 50 m/s, or greater than 60 m/s. In a further embodiment, the time period over which the fiber temperature is in the range from 1200° C. to 1700° C. is at least 10.0 sec for draw speeds of greater than 10 m/s, or greater than 20 m/s, or greater than 30 m/s, or greater than 40 m/s, or greater than 50 m/s, or greater than 60 m/s.

Figure 5:
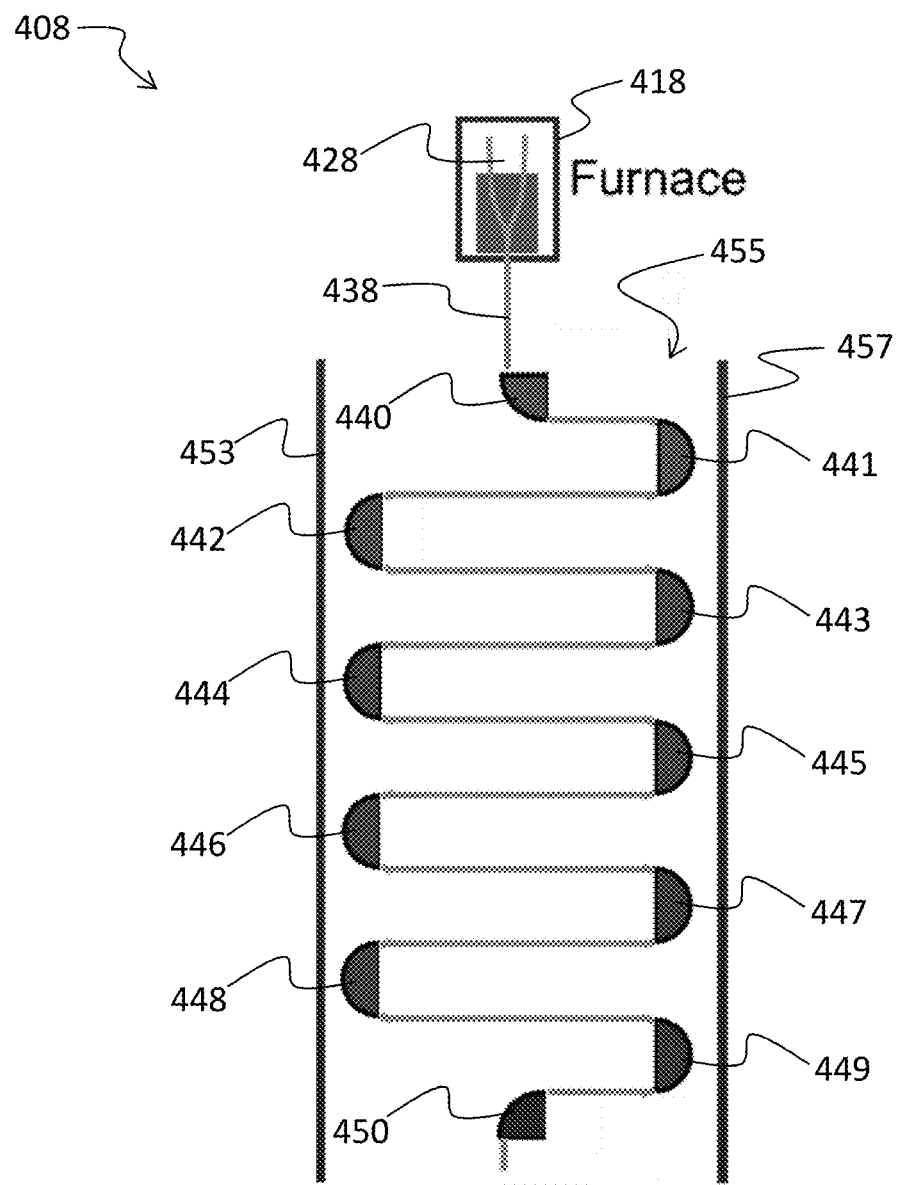
FIG. 5 depicts an embodiment of a fiber processing system having fluid bearing devices deployed within a heated processing region.

FIG. 5 shows a section of a fiber processing system that includes a plurality of fluid bearing devices operatively connected to a draw furnace. System 408 includes draw furnace 418 with fiber preform 428. Fiber 438 is drawn from preform 428 and is conveyed through a series of fluid bearing devices 440-450. Conveyance is driven by tension provided by a drawing mechanism (not shown). In the embodiment of FIG. 5, the fluid bearing devices are contained within a heated region 455 of the processing pathway and become heated fluid bearing devices. The heated region is defined by boundaries 453 and 457. In one embodiment, heated region 455 is a region within a furnace.

Fluid bearing devices 440-450 may have the design shown in FIGS. 2 and 3 and may be constructed from steel or other metals known in the art to function in high temperature environments. Placement of fluid bearing devices 440-450 within heated region 455 maintains fluid bearing devices 440-450 at elevated temperatures and enables controlled cooling of fiber 438 as it progresses along the process pathway away from draw furnace 418. The levitating fluid supplied to one or more of fluid bearing devices may optionally be heated to provide an additional degree of control over the temperature of the fiber. The temperature of the levitating fluid supplied to any of the fluid bearing devices may be the same as or different from the temperature of heated region 455 in the vicinity of the fluid bearing device. In certain embodiments, the temperature of the levitating fluid supplied to at least one of the fluid bearing devices is greater than the temperature of heated region 455 in the vicinity of the fluid bearing device. The temperature of the levitating fluid supplied to the fluid bearing device may be greater than the temperature of fiber 438 as it exits draw furnace 418. In other embodiments, the temperature of the levitating fluid supplied to at least one of the fluid bearing devices is less than the temperature of heated region 455 in the vicinity of the fluid bearing device.

Heated region 455 is maintained at a temperature less than the temperature of fiber 438 as it exits draw furnace 418 and permits controlled cooling of fiber 438 as it is conveyed along the process pathway. The temperature of heated region 455 may be less than 1500° C., or less than 1450° C., or less than 1400° C., or less than 1350° C., or less than 1300° C., or less than 1250° C., or less than 1200° C., or less than 1150° C., or less than 1100° C., or less than 1050° C. The temperature of heated region 455 may be uniform or non-uniform. In one embodiment, the heated region 455 includes a gradient in temperature. The temperature may be highest at the point of entry of fiber 438 into fluid bearing device 440 and may continuously decrease in the direction of fluid bearing device 450. The temperature gradient may have a maximum temperature in the vicinity of fluid bearing device 440 and a minimum temperature in the vicinity of fluid bearing device 450. The maximum temperature may be greater than 1250° C., or greater than 1300° C., or greater than 1350° C., or greater than 1400° C., or greater than 1450° C., or between 1250° C. and 1500° C., or between 1300° C. and 1450° C. The minimum temperature may be greater than 1000° C., or greater than 1050° C., or greater than 1100° C., or greater than 1150° C., or greater than 1200° C., or between 1000° C. and 1300° C., or between 1050° C. and 1250° C., or between 1100° C. and 1200° C.

The number of fluid bearing devices in heated region 455 may be two or more, or four or more, or six or more, or eight or more, or ten or more.

Heated region 455 may include a plurality of temperature zones, where each zone is at a different temperature or includes a different range of temperatures. The temperature ranges of different zones may overlap. Each zone may include one or more fluid bearing devices. In one embodiment, heated region 455 includes two or more temperature zones, where each temperature zone includes a fluid bearing device. In another embodiment, heated region 455 includes four or more temperature zones, where each temperature zone includes a fluid bearing device. In still another embodiment, heated region 455 includes six or more temperature zones, where each temperature zone includes a fluid bearing device. In yet another embodiment, heated region 455 includes eight or more temperature zones, where each temperature zone includes a fluid bearing device. In a further embodiment, heated region 455 includes ten or more temperature zones, where each temperature zone includes a fluid bearing device.

The difference in temperature between adjacent zones may be uniform or non-uniform. The temperature difference between adjacent zones may be less than 100° C., or less than 80° C., or less than 60° C., or less than 40° C., or less than 20° C.

After exiting fluid bearing device 450, the fiber may be directed to additional fluid bearing devices for further controlled cooling or to other process units (e.g. coating units, testing units, or spooling units).

The temperature of a heated fluid bearing device may correspond to the temperature of the heated region or temperature zone in which the heated fluid bearing device is positioned. The temperature of the heated fluid bearing device may be at least 500° C., or at least 750° C., or at least 1000° C., or at least 1250° C., or in the range from 500° C.-1500° C., or in the range from 750° C.-1250° C., or in the range from 850° C.-1150° C.

Deployment of the fluid bearing devices as described herein permits greater control over the cooling rate of the fiber. The cooling rate can be adjusted to be slower than the cooling rate associated with prior art systems (such as the system shown in FIG. 1) and the slower cooling rates enable production of fibers with lower fictive temperature than is possible with systems of the prior art. The cooling rate can be adjusted by controlling the temperature of the levitating fluid supplied to the fluid bearing devices, the temperature of fluid bearing devices themselves through direct placement of the fluid bearing devices in heated regions of the process pathway, or a combination thereof.

The fluid bearing devices also alter the pathway of the fiber through processing system. In particular, the pathway can be modified to extend the length of time at which the fiber is at a particular temperature or within a particular temperature region or zone of the processing system. In the prior art systems, the direction of conveyance of the fiber through the processing system is vertical through the thermal treatment zone (e.g. treatment zone 130 of FIG. 1) and cools from a temperature of ~1550° C. or higher at the exit of the draw furnace to a temperature of ~1000° C. along the vertical process pathway immediately following the draw furnace. For fixed draw speed, a vertical process pathway minimizes the time at which the fiber temperature is in the temperature range above 1000° C. At typical manufacturing draw speeds, the residence time of the fiber in the temperature range from 1000° C. to 1700° C. is 0.2 sec or less. The short residence time leads to rapid cooling of the fiber and produces fibers with high fictive temperature.

The present disclosure identifies a benefit in prolonging the residence time of the fiber in the temperature range from 1000° C. to 1700° C. Deployment of fluid bearing devices operated with heated levitating fluids and/or in heated regions of the processing system can extend the residence time of the fiber in particular temperature regimes. The fluid bearing devices permit redirection of the fiber from one direction of conveyance to another direction of conveyance along the process pathway. In the embodiment shown in FIG. 5, for example, fluid bearing device 440 redirects fiber 438 from a vertical direction of conveyance (as fiber 438 exits draw furnace 418) to a horizontal direction of conveyance (as fiber 438 enters fluid bearing device 441). Fluid bearing device 441 receives fiber 438 in a first horizontal direction of conveyance and redirects it to a second horizontal direction of conveyance. The first horizontal direction of conveyance is the horizontal direction extending from the exit of fluid bearing device 440 to the entrance of fluid bearing device 441 and the second horizontal direction of conveyance is the horizontal direction extending from the exit of fluid bearing device 441 to the entrance of fluid bearing device 442. The second horizontal direction of conveyance is parallel to the first horizontal direction of conveyance, but not collinear with it. By controlling the separation between fluid bearing devices 441 and 442, it is possible to control the length of the process pathway along the second horizontal direction as well as the time period over which fiber 438 resides at the temperatures in the upper portion of heated region 455. The extended time period allows for more complete structural relaxation of the fiber at the temperature associated with the second horizontal direction of conveyance and furthers the objective of lowering the fictive temperature of the fiber produced from system 408. Succeeding fluid bearing devices in heated region 455 similarly effect redirection of fiber 438 from one direction of conveyance to another direction of conveyance and similarly provide for longer residence times of the fiber at the temperatures of heated region 455 in the vicinity of each of the fluid bearing devices. The combined residence time of the fiber at temperatures in the range from 1000° C. to 1700° C. in processes having two or more directions of conveyances may be at least 0.5 sec, or at least 1.0 sec, or at least 2.0 sec, or at least 4.0 sec, or at least 6.0 sec, or at least 8.0 sec, or at least 10.0 sec along any one direction of conveyance and/or any combination of two or more directions of conveyance.

The longer process path length over a series of one or more heated regions with controlled temperature permits slower cooling of the fiber at a given draw speed relative to the vertical process path available in the prior art. The slower cooling facilitates more complete structural relaxation of the fiber and leads to production of fibers with lower fictive temperature. The path length, temperature profile in the heated region, number and spacing between fluid bearing devices, and/or temperature of levitating fluid supplied to the fluid bearing devices can be configured to control the time period over which the fiber temperature is in the range from 1000° C. to 1700° C., or 1050° C. to 1600° C., or 1100° C. to 1550° C., or 1100° C. to 1500° C. at a given draw speed. The time period for any of the foregoing temperature ranges may be at least 0.5 sec, or at least 1.0 sec, or at least 2.0 sec, or at least 4.0 sec, or at least 6.0 sec, or at least 8.0 sec, or at least 10.0 sec at a given draw speed. The time periods specified herein for the fiber over the temperature ranges specified herein are achievable at draw speeds of greater than 10 m/s, or greater than 20 m/s, or greater than 30 m/s, or greater than 40 m/s, or greater than 50 m/s, or greater than 60 m/s.

Although the embodiment shown in FIG. 5 depicts vertical and horizontal directions of conveyance for the fiber, the depiction is illustrative and present disclosure extends to any directions of conveyance, including directions that are non-horizontal, non-vertical and/or at arbitrary angles relative to the floor of the manufacturing facility. The fluid bearing devices may redirect the fiber from a first direction of conveyance to a second direction of conveyance, where the angle between the first and second directions of conveyance is arbitrary.

Figure 6A:
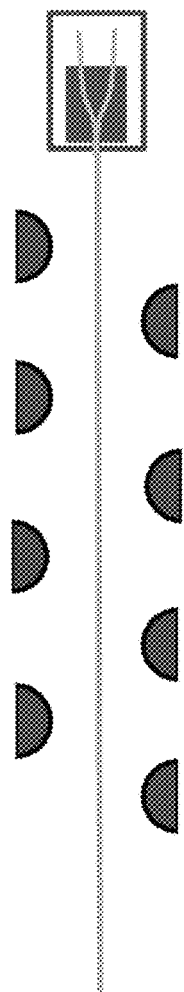
FIGS. 6a-6e depict an embodiment of a process for engaging fluid bearing devices with an optical fiber and adjustment of the path length of the fiber through different sections of the processing region.
Figure 6B:
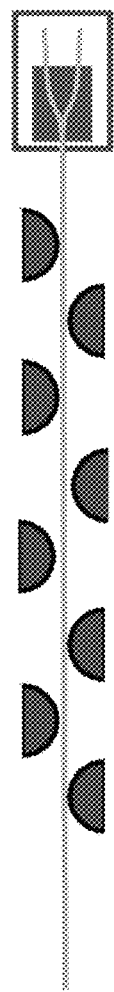
Figure 6C:
Figure 6D:
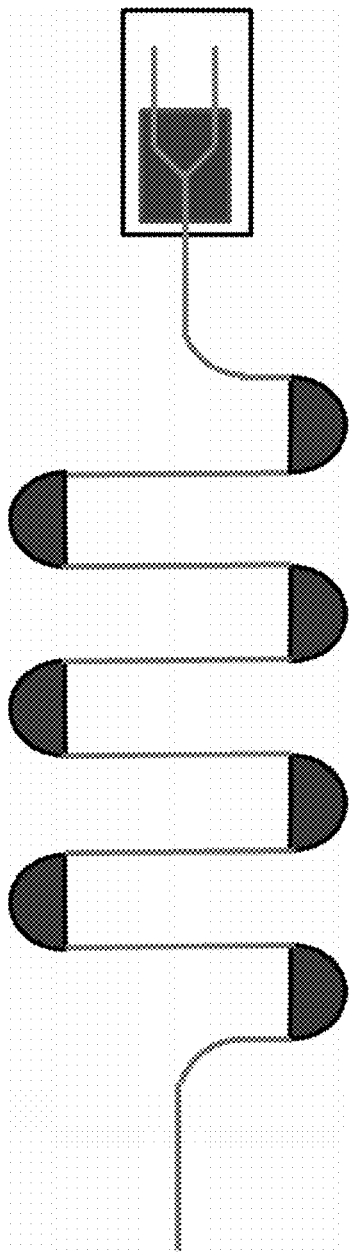
Figure 6E:
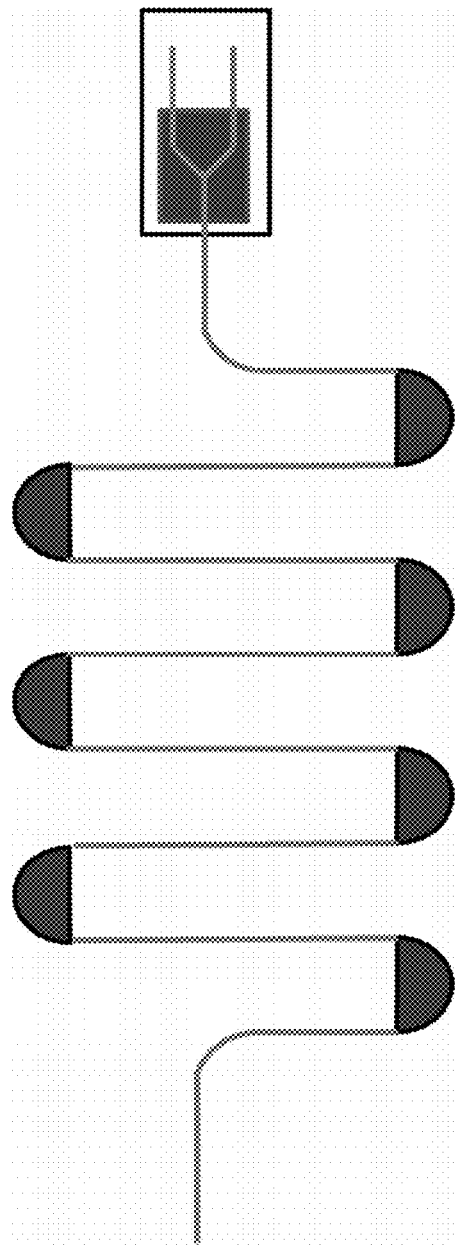

The present description further extends to methods for arranging the fluid bearing devices in the process system. The methods may be useful, for example, in initiating the process or adjusting the process. FIGS. 6a-6e illustrate an embodiment of arranging fluid bearing devices and adjusting the path length of the fiber through different sections of the processing region. The components of the system shown in FIGS. 6a-6e correspond to those shown in FIGS. 4 and 5 and include a draw furnace, fiber preform, fluid bearing devices, and an optical fiber. A drawing mechanism (not shown) is also present. FIG. 6a shows an initial state of the system in which the optical fiber is drawn or conveyed in a vertical direction. The fluid bearing devices are positioned away from the optical fiber and are disengaged from the optical fiber. In FIG. 6b, the fluid bearing devices are repositioned to engage the optical fiber. The repositioning of the fluid bearing devices includes translating the fluid bearing devices to permit the levitating fluid to influence the position of the optical fiber. Further translation of the fluid bearing devices occurs in FIG. 6c and the path of the optical fiber is redirected from a vertical direction of conveyance to include multiple segments having various directions of conveyance as shown. Further motion of the fluid bearing devices and adjustment of the process path length between fluid bearing devices is illustrated in FIG. 6d and FIG. 6e.

Figure 7:
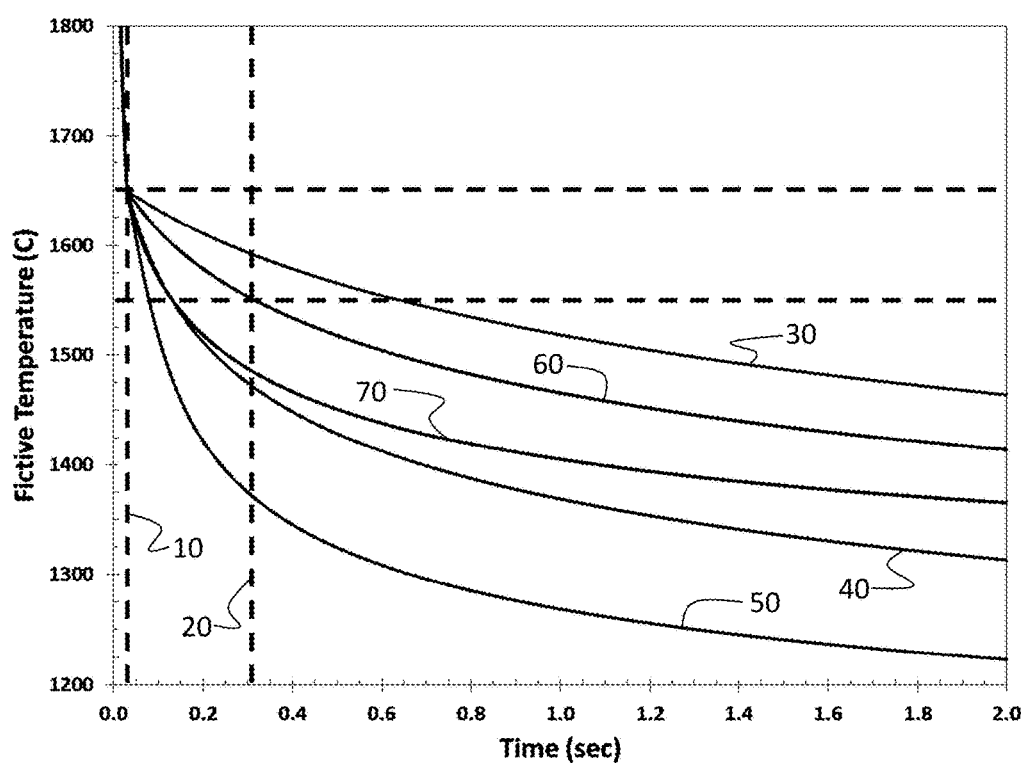
FIG. 7 shows the variation in fictive temperature of a silica fiber with residence time (up to 2 sec) of the fiber in a processing system with furnaces at operated at constant temperatures ranging from 900° C. to 1300° C.
Figure 8:
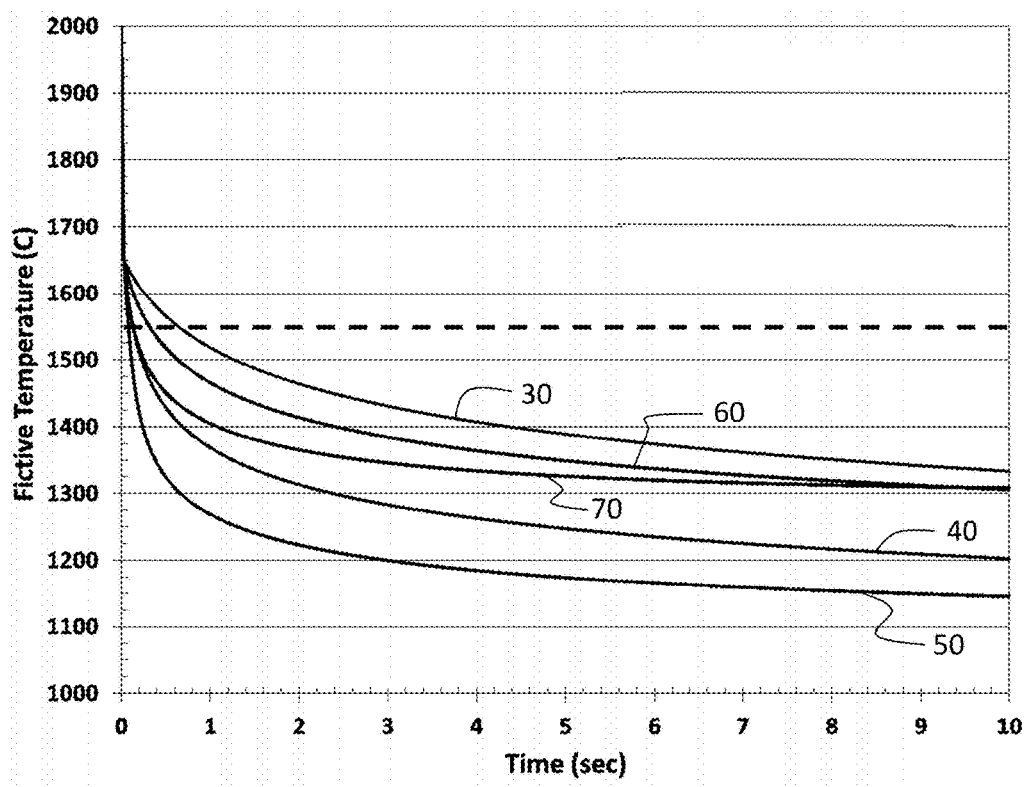
FIG. 8 shows the variation in fictive temperature of a silica fiber with residence time (up to 10 sec) of the fiber in a processing system with furnaces at operated at constant temperatures ranging from 900° C. to 1300° C.

FIG. 7 illustrates the modeled variation in fiber fictive temperature as a function of residence time in furnaces set at various temperatures for silica fibers processed in a fiber draw system in accordance with the present description. The residence time at a particular temperature or temperature range can be controlled through the arrangement, spacing, and number of fluid bearing devices as described herein. Many possible system configurations can be employed to achieve a desired residence time. In the model, the fiber was taken to exit the draw furnace at time t=0.02 sec and enter the furnace at time 0.03 sec (depicted as dashed line 10). The temperature of the fiber as it entered the furnace was ~1650° C. In the model, the heated region of the furnace was maintained at a constant temperature. Traces 30, 40, 50, 60, and 70 show the variation in fiber fictive temperature as a function of time in the furnace for furnaces operated at constant temperatures of 900° C., 1000° C., 1100° C., 1200° C., and 1300° C.; respectively. The results indicate that the fictive temperature of the fiber decreases with increasing time in the furnace. Dashed line 20 marks a residence time of ~0.2 sec in furnaces set at each of the constant operating temperatures. The residence time of ~0.2 sec is typical of prior art fiber processing system. The data shown in FIG. 7 indicate that the fiber fictive temperature continues to decrease with increasing residence time beyond 0.2 sec in the furnace. For residence times of 2 sec, the fiber fictive temperature is less than the fiber fictive temperature observed at a residence time of 0.2 sec by 100° C. or more. FIG. 8 shows an extension of the data presented in FIG. 7 to residence times up to 10 sec for each furnace temperature. Data curves and labels shown in FIG. 8 correspond to those shown in FIG. 7.

Figure 9:
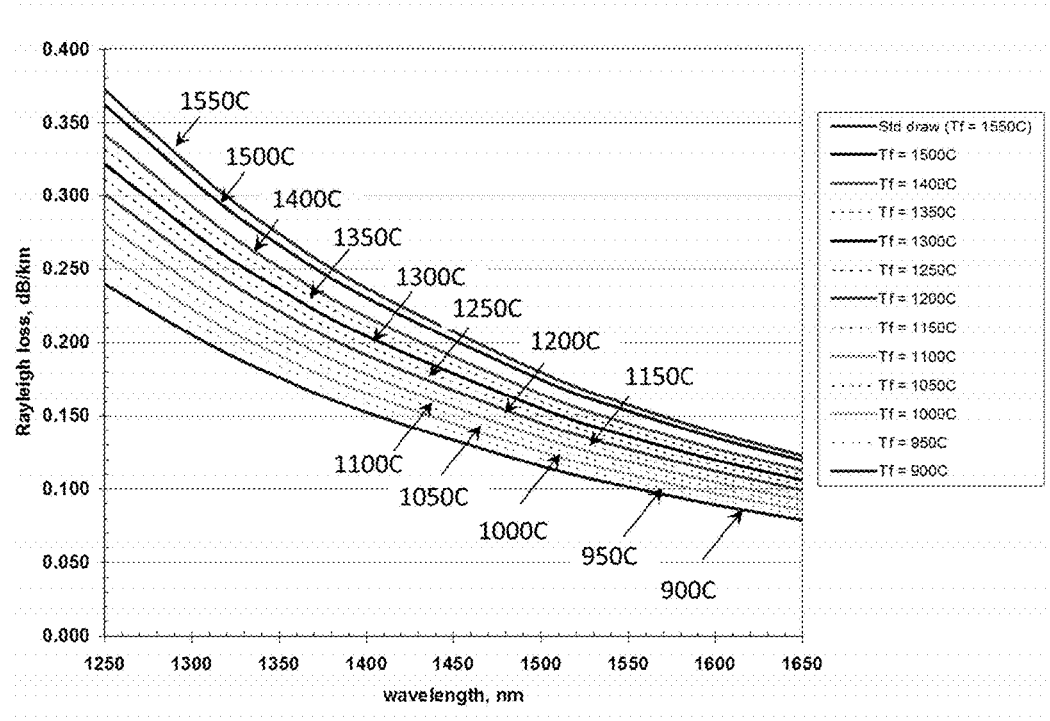
FIG. 9 shows the attenuation as a function of wavelength for silica fibers having different fictive temperatures.

FIG. 9 shows Rayleigh scattering contribution to attenuation as a function of wavelength for silica fibers processed in accordance with the present description. The optical fibers had fictive temperatures ranging from 900° C. to 1400° C. in increments of 50° C. Comparative data curves are presented for fibers having fictive temperatures (1550° C. and 1500° C.) consistent with prior art fiber processing systems. Individual data curves are not labeled, but are presented in order of decreasing fictive temperature as indicated in the legend. The data demonstrate a decrease in attenuation as the fictive temperature of the fiber decreases. The lowest attenuation was observed in the fiber having a fictive temperature of 900° C. and the highest attenuation was observed in the fiber having a fictive temperature of 1550° C. Intermediate levels of attenuation were observed for fibers having fictive temperatures between 900° C. and 1500° C. Attenuation was observed to consistently decrease throughout the indicated wavelength range as the fictive temperature of the fiber decreased.

The fictive temperature of silica fibers prepared in accordance with the methods of the present description may be less than 1450° C., or less than 1400° C., or less than 1350° C., or less than 1300° C., or less than 1250° C., or less than 1200° C., or less than 1150° C., or less than 1100° C. The attenuation of silica fibers prepared in accordance with the methods of the present description at 1550 nm may be less than 0.18 dB/km, or less than 0.17 dB/km, or less than 0.16 dB/km, or less than 0.15 dB/km, or less than 0.14 dB/km, or less than 0.13 dB/km, or less than 0.12 dB/km. In one embodiment, the fiber has a fictive temperature less than 1450° C. and an attenuation at 1550 nm less than 0.18 dB/km. In one embodiment, the fiber has a fictive temperature less than 1400° C. and an attenuation at 1550 nm less than 0.17 dB/km. In one embodiment, the fiber has a fictive temperature less than 1350° C. and an attenuation at 1550 nm less than 0.16 dB/km. In one embodiment, the fiber has a fictive temperature less than 1300° C. and an attenuation at 1550 nm less than 0.15 dB/km. In one embodiment, the fiber has a fictive temperature less than 1250° C. and an attenuation at 1550 nm less than 0.14 dB/km. In one embodiment, the fiber has a fictive temperature less than 1250° C. and an attenuation at 1550 nm less than 0.13 dB/km. In one embodiment, the fiber has a fictive temperature less than 1250° C. and an attenuation at 1550 nm less than 0.12 dB/km. In one embodiment, the fiber has a fictive temperature less than 1250° C. and an attenuation at 1550 nm less than 0.12 dB/km. In one embodiment, the fiber has a fictive temperature less than 1250° C. and an attenuation at 1550 nm less than 0.10 dB/km. The fiber fictive temperatures and/or attenuation values may be obtained from the methods described herein at draw speeds of greater than 10 m/s, or greater than 20 m/s, or greater than 30 m/s, or greater than 40 m/s, or greater than 50 m/s, or greater than 60 m/s.

The present description extends to optical fibers made from any of the processes disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of processing an optical fiber comprising:
directing an optical fiber in a first direction of conveyance, said optical fiber having a first temperature along said first direction of conveyance, said first temperature being between 1000° C. and 1700° C.; and
redirecting said optical fiber from said first direction of conveyance to a second direction of conveyance using a series of at least two heated fluid bearing devices, said optical fiber having a second temperature upon said redirecting to said second direction of conveyance, said second temperature being between 1000° C. and 1700° C.;
wherein said optical fiber is maintained at said first temperature and said second temperature for a combined time greater than 0.5 sec; and
wherein a temperature of each one of said at least two heated fluid bearing devices is at least 500° C.

2. The method of claim 1, wherein said first temperature and said second temperature are between 1100° C. and 1500° C.

3. The method of claim 1, wherein said combined time is at least 2.0 sec.

4. The method of claim 1, further comprising drawing said optical fiber, said drawing including heating a fiber preform.

5. The method of claim 1, wherein said directing occurs at a draw speed greater than 40 m/s.

6. The method of claim 1, wherein said redirecting comprises levitating said optical fiber with a heated fluid.

7. The method of claim 1, wherein said temperature of said at least two heated fluid bearing devices is at least 750° C.

8. The method of claim 1, wherein said temperature of said at least two heated fluid bearing devices is at least 1000° C.

9. The method of claim 1, wherein said series of at least two heated fluid bearing devices includes at least four heated fluid bearing devices.

10. The method of claim 1, wherein said series of at least two heated fluid bearing devices includes at least six heated fluid bearing devices.

11. The method of claim 1, wherein said temperature of adjacent heated fluid bearing devices within said series of at least two heated fluid bearing devices differs by 5° C. to 100° C. and said temperature of said adjacent heated fluid bearing devices descends in a direction of fiber draw.

12. A method of processing an optical fiber comprising:
directing an optical fiber in a first direction of conveyance, said optical fiber having a first temperature along said first direction of conveyance, said first temperature being in the range from 1000° C. and 1700° C.; and
redirecting said optical fiber from said first direction of conveyance to a second direction of conveyance using a series of at least two fluid bearing devices, said optical fiber having a second temperature upon said redirecting to said second direction of conveyance, said second temperature being in the range from 1000° C. and 1700° C.;
wherein said optical fiber is maintained at said first temperature and said second temperature for a combined time greater than 0.5 sec; and;
wherein said optical fiber in said first direction of conveyance, said series of at least two fluid bearing devices, and said optical fiber in said second direction of conveyance are contained in a heated processing region, said heated processing region maintaining said first temperature and said second temperature.

13. The method of claim 12, wherein said temperature of said heat processing region is less than 1450° C.

14. The method of claim 12, wherein said temperature of said heat processing region is less than 1250° C.

15. The method of claim 12, wherein said temperature of said heat processing region is less than 1050° C.

16. The method of claim 12, wherein said series of at least two fluid bearing devices includes at least four fluid bearing devices.

17. The method of claim 12, wherein said series at least two fluid bearing devices includes at least six fluid bearing devices.

18. The method of claim 12, wherein a temperature of adjacent fluid bearing devices within said series of at least two fluid bearing devices contained in said heated processing region differs by 5° C. to 100° C. and said temperature of said adjacent fluid bearing devices descends in a direction of fiber draw.

* * * * *